(12) United States Patent
Ozaki

(10) Patent No.: US 9,013,764 B2
(45) Date of Patent: Apr. 21, 2015

(54) READING APPARATUS THAT READS ORIGINAL SHEET WHILE CONVEYING THE SAME

(71) Applicant: Kazumasa Ozaki, Nagoya (JP)

(72) Inventor: Kazumasa Ozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/166,268

(22) Filed: Jan. 28, 2014

(65) Prior Publication Data

US 2014/0211277 A1 Jul. 31, 2014

(30) Foreign Application Priority Data

Jan. 31, 2013 (JP) ................. 2013-016699

(51) Int. Cl.
- *H04N 1/04* (2006.01)
- *H04N 1/00* (2006.01)
- *H04N 1/10* (2006.01)

(52) U.S. Cl.
CPC ......... *H04N 1/00588* (2013.01); *H04N 1/1008* (2013.01)

(58) Field of Classification Search
CPC .................. B65H 2511/10; B65H 7/00; H04N 2201/0094; H04N 1/00482; H04N 2201/0082; H04N 2201/04755; H04N 2201/3271; H04N 7/18; H04N 1/00; H04N 1/00411; H04N 1/0044; H04N 1/00572; H04N 1/00588
USPC ........................... 358/496, 498, 488, 474, 449
See application file for complete search history.

(56) References Cited

U.S. PATENT DOCUMENTS

| | | | |
|---|---|---|---|
| 6,493,113 B1 * | 12/2002 | Fujii et al. | 358/488 |
| 6,585,159 B1 * | 7/2003 | Meier et al. | 235/462.31 |
| 7,086,595 B2 * | 8/2006 | Zhu et al. | 235/462.09 |
| 7,446,908 B2 | 11/2008 | Araki et al. | |
| 7,659,915 B2 * | 2/2010 | Kurzweil et al. | 345/698 |
| 7,840,033 B2 * | 11/2010 | Kurzweil et al. | 382/114 |
| 8,249,309 B2 * | 8/2012 | Kurzweil et al. | 382/114 |
| 8,676,273 B1 * | 3/2014 | Fujisaki | 455/567 |
| 8,760,727 B2 * | 6/2014 | Hara | 358/449 |
| 8,873,890 B2 * | 10/2014 | Kurzweil et al. | 382/301 |
| 2004/0184120 A1 | 9/2004 | Araki et al. | |
| 2006/0013483 A1 * | 1/2006 | Kurzweil et al. | 382/176 |
| 2006/0017752 A1 * | 1/2006 | Kurzweil et al. | 345/698 |

(Continued)

FOREIGN PATENT DOCUMENTS

| | | | |
|---|---|---|---|
| JP | H10-319648 A | 12/1998 | |
| JP | 11-127301 A | 5/1999 | |

(Continued)

*Primary Examiner* — Negussie Worku
(74) *Attorney, Agent, or Firm* — Banner & Witcoff, Ltd.

(57) ABSTRACT

In a reading apparatus, a control device is configured to: acquire a conveyance path switching information indicating whether a conveyance path switching unit has switched a conveyance path to a first conveyance path or a second conveyance path; judge, based on detection results by a width detecting unit, whether a type of an original sheet that is currently placed on an original sheet placing unit and that is not yet conveyed by a conveyance unit from the original sheet placing unit is a first type or a second type; and determine, based on both of the conveyance path switching information and the type of the not-yet-conveyed original sheet, whether the conveyance unit should stop conveyance of a preceding original sheet that the conveyance unit is currently conveying.

6 Claims, 10 Drawing Sheets

(56) References Cited

U.S. PATENT DOCUMENTS

2011/0013234 A1* 1/2011 Takahashi et al. ............ 358/474
2013/0083366 A1 4/2013 Motoyama
2013/0083374 A1* 4/2013 Nagai .......................... 358/488
2014/0139896 A1* 5/2014 Osakabe et al. .............. 358/498

FOREIGN PATENT DOCUMENTS

| | | |
|---|---|---|
| JP | 2004-282438 A | 10/2004 |
| JP | 2007-049300 A | 2/2007 |
| JP | 2013-077953 A | 4/2013 |

* cited by examiner

READING APPARATUS THAT READS ORIGINAL SHEET WHILE CONVEYING THE SAME

CROSS-REFERENCE TO RELATED APPLICATION

This application claims priority from Japanese Patent Application No. 2013-016699 filed Jan. 31, 2013. The entire content of this priority application is incorporated herein by reference.

TECHNICAL FIELD

The present invention relates to a reading apparatus for reading an original sheet while conveying the original sheet.

BACKGROUND

There is conventionally known a reading apparatus for reading an original sheet while conveying the same.

SUMMARY

It is noted that thick original sheets are apt to be jammed in the reading apparatus. Or, even though the thick sheets have successfully been conveyed through the reading apparatus, the thick sheets are apt to be stiffly curved or bent after being conveyed through the apparatus. A reading apparatus has therefore been conventionally proposed, in which the thickness of an original sheet conveyed is detected, and a conveying path is switched between a plurality of different conveying paths depending on the detected thickness.

Problems will possibly occur in the reading apparatus due to not only the thickness but also the size of the original sheets, that is, the size of the surfaces of the original sheets. It is conceivable that the reading apparatus has two conveying paths leading to different discharge ports. The width of one discharge port is narrower than that of the other discharge port. If an original sheet whose width is greater than the width of the narrower discharge port is conveyed along the conveying path leading to the narrower discharge port, the original sheet will be jammed and damaged. In order to restrain damage of an original sheet, it is conceivable to detect the size of the original sheet conveyed. Depending on the detected size of the original sheet, a conveyance path along which the original sheet is to be conveyed is switched between the two conveying paths.

However, there is a possibility that while an original sheet (first sheet) whose size has already been detected is being conveyed, another original sheet (second sheet) whose size is different from that of the first sheet is newly supplied to the reading apparatus. In such a case, the size of the second sheet is inconsistent with the conveying path that has been set for conveying the first original sheet. So, the second original sheet will possibly be jammed and damaged.

In view of the foregoing, it is an object of the invention to provide an improved reading apparatus that is for reading original sheets while conveying the same in succession and that can restrain damages of the original sheets even if while the reading apparatus is conveying an original sheet, the reading apparatus is newly supplied with another original sheet whose size is different from the currently-being-conveyed, preceding original sheet.

In order to attain the above and other objects, the invention provides a reading apparatus including: an original sheet placing unit; a width detecting unit; a conveyance unit; a reading unit; a conveyance path switching unit; and a control device. The width detecting unit is configured to detect a width of an original sheet that is placed on the original sheet placing unit. The conveyance unit is configured to convey the original sheet from the original sheet placing unit. The reading unit is configured to read the original sheet that is being conveyed by the conveyance unit. The conveyance path switching unit is configured to switch, between a first conveyance path and a second conveyance path, a conveyance path to which the conveyance unit is to guide the original sheet, the first conveyance path leading to a first discharge port, the second conveyance path leading to a second discharge port, a width of the second discharge port defined in a width direction of the original sheet being smaller than a width of the first discharge port defined in the width direction of the original sheet. The control device is configured to: acquire a conveyance path switching information indicating whether the conveyance path switching unit has switched the conveyance path to the first conveyance path or the second conveyance path; judge, based on detection results by the width detecting unit, whether a type of an original sheet that is currently placed on the original sheet placing unit and that is not yet conveyed by the conveyance unit from the original sheet placing unit is a first type or a second type, first type original sheets having widths greater than or equal to a prescribed reference width, second type original sheets having widths smaller than the prescribed reference width, the prescribed reference width being equal to the width of the second discharge port; and determine, based on both of the conveyance path switching information and the type of the not-yet-conveyed original sheet, whether the conveyance unit should stop conveyance of a preceding original sheet that the conveyance unit is currently conveying.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
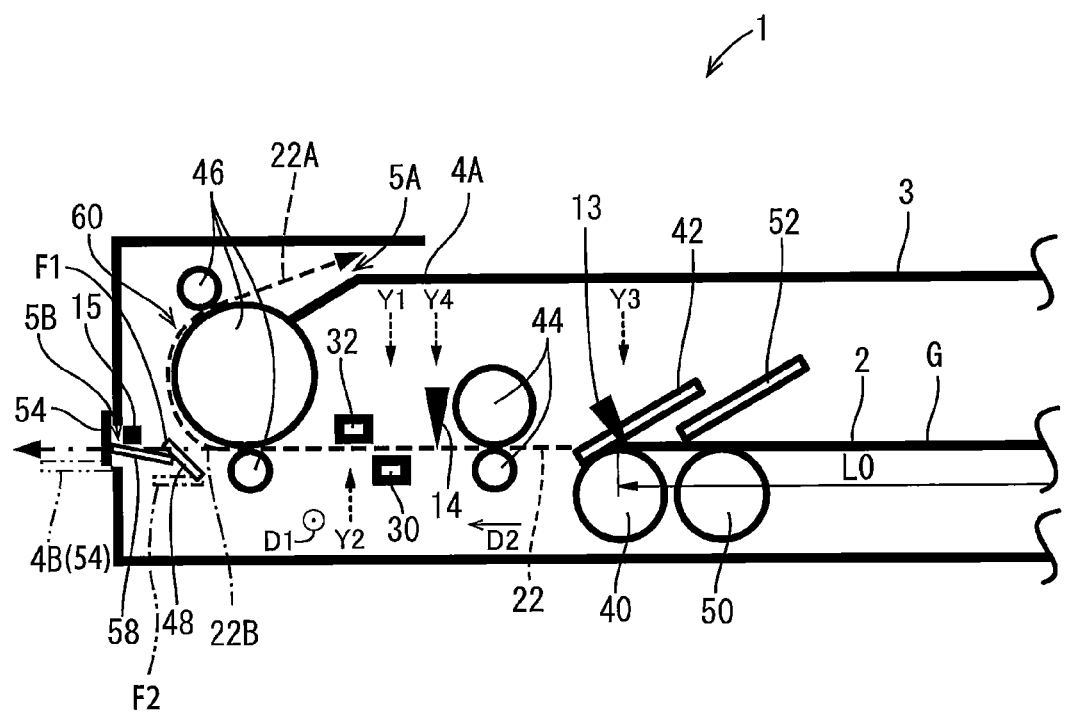
FIG. 1 is a cross-sectional side view schematically showing a reading apparatus according to a first embodiment of the present invention.

A reading apparatus according to embodiments of the invention will be described while referring to the accompanying drawings wherein like parts and components are designated by the same reference numerals to avoid duplicating description.

<First Embodiment>

A first embodiment will be described with reference to FIGS. 1 to 9.

1. Mechanical Configuration of Reading Apparatus

As shown in FIG. 1, a reading apparatus 1 is a sheet-feed scanner having a sheet feed tray 2 on which a user can place a plurality of original sheets G. The reading apparatus 1 conveys, individually in succession, the plurality of original sheets G from the sheet feed tray 2 to a first sheet discharge tray 4A or a second sheet discharge tray 4B, and reads the conveyed original sheets G by using either one of a first CIS 30 and a second CIS 32 which are contained in a main body 3 of the reading apparatus 1.

In the main body 3 of the reading apparatus 1, a conveyance path 22 is provided to connect the sheet feed tray 2 to the first and second sheet discharge trays 4A and 4B. Around the conveyance path 22, the following components are provided: a sheet feed roller 40, a separation pad 42, first conveyance rollers 44, second conveyance rollers 46, a switching plate 48, the first CIS 30, the second CIS 32, a front sensor (referred to as F sensor, hereinafter) 13, and a rear sensor (referred to as R sensor, hereinafter) 14.

The sheet feed roller 40 is driven by a motor M (see FIG. 3) to rotate, while being in contact with an original sheet G placed on the sheet feed tray 2, thereby sending out the original sheet G into the main body 3. When a plurality of original sheets G are placed on the sheet feed tray 2, the original sheets G are separated from one another due to a friction force of the separation pad 42, and are sent out one sheet at a time to the conveyance path 22.

The sheet feed tray 2 is provided with a suction roller 50 and a suction pad 52, which confront each other across the original sheets G placed on the sheet feed tray 2. The suction roller 50 and the suction pad 52 assist the sheet feed roller 40 and the separation pad 42 in sending out an original sheet G from the sheet feed tray 2 to the conveyance path 22.

Similarly to the sheet feed roller 40, the conveyance rollers 44 and 46 are driven by the motor M to convey along the conveyance path 22 in a conveyance direction D2 the original sheet G that has been drawn into the inside of the main body 3. Along the conveyance path 22, the first conveyance rollers 44 are disposed on the upstream side relative to the second conveyance rollers 46 in the conveyance direction D2.

The first conveyance rollers 44 convey along the conveyance path 22 in succession the original sheets G that have been drawn into the inside of the main body 3. The conveyance speed at which the first conveyance rollers 44 convey the original sheets G is set faster than the conveyance speed at which the sheet feed roller 40 conveys the original sheets G. The sheet feed roller 40 employs a one-way clutch mechanism, wherein the inter-sheet distances Z between the successively conveyed original sheets G are determined based on: the difference between the conveyance speeds of the sheet feed roller 40 and the first conveyance rollers 44; and the lengths L0 of the original sheets G in the conveyance direction D2. So, in order to determine the inter-sheet distances Z, a central processing unit (CPU) 20 to be described later does not need to identify the lengths of the original sheets G, prior to starting conveying the original sheets G.

The first CIS 30 is disposed at a first reading position Y1 that is between the first conveyance rollers 44 and the second conveyance rollers 46 on the conveyance path 22. The first CIS 30 is for reading the front surface of an original sheet G that is being conveyed by the conveyance rollers 44 and 46.

The first CIS 30 reads the original sheet G in a main scanning direction D1 that is orthogonal to the conveyance direction D2. The second CIS 32 is disposed at a second reading position Y2 that is between the first reading position Y1 and the second conveyance rollers 46 on the conveyance path 22. The second CIS 32 is for reading a back surface of an original sheet G that is being conveyed by the conveyance rollers 44 and 46. The second CIS 32 reads the original sheet G also in the main scanning direction D1.

The second conveyance rollers 46 are for discharging the original sheets G onto the first sheet discharge tray 4A or the second sheet discharge 4B. The conveyance path 22 diverges into a U-turn path (referred to as U path, hereinafter) 22A and a straight path (referred to as S path, hereinafter) 22B at a position where the conveyance path 22 reaches the second conveyance rollers 46 from the upstream side thereof in the conveyance direction D2. The S path 22B extends substantially linearly and is connected to the second sheet discharge tray 4B. The S path 22B is used for conveying small sheets such as business cards and postcards. Part of the U path 22A (curved portion 60) is curved along the peripheries of rollers constituting the second conveyance rollers 46. The U path 22A is connected to the first sheet discharge tray 4A. The U path 22A is used for conveying large sheets such as A4-size sheets. The radius of curvature in the curved portion 60 is smaller than that of the linearly-extending S path 22B.

The first sheet discharge tray 4A is formed by an upper portion of the outer case of the main body 3. A border portion 5A is defined between the U path 22A and the first sheet discharge tray 4A. An opening 5B is formed through the outer case of the main body 3. The second sheet discharge tray 4B is configured from a discharge tray plate 54 that is part of an outer case of the main body 3. The discharge tray plate 54 is pivotable to the main body 3. The discharge tray plate 54 pivots between a closed state indicated by a solid line in FIG. 1 and an open state indicated by a two-dot chain line in FIG. 1. When in the closed state, the discharge tray plate 54 closes the opening 5B. When in the open state, the discharge tray plate 54 opens the opening 5B. In the open state, the discharge tray plate 54 serves as the second sheet discharge tray 4B. The opening 5B serves as a border portion between the S path 22B and the second sheet discharge tray 4B.

The switching plate 48 is disposed on the opposite side of the second conveyance rollers 46 with respect to the conveyance path 22. The switching plate 48 switches between a first posture F1 (indicted by a solid line) and a second posture F2 (indicated by a two-dotted chain line). When in the first posture F1, the switching plate 48 extends along the U path 22A. When in the second posture F2, the switching plate 48 extends along the S path 22B.

The switching plate 48 is interlocked with the discharge tray plate 54 via an interlocking member 58, and changes its posture in interlocking relationship with the discharge tray plate 54. That is, when the discharge tray plate 54 becomes the closed state, the switching plate 48 switches to the first posture F1. When the discharge tray plate 54 becomes the open state, the switching plate 48 switches to the second posture F2. In the main body 3, a tray plate detection sensor 15 is provided to detect the open and closed states of the discharge tray plate 54. The tray plate detection sensor 15 is ON when the discharge tray plate 54 is in the closed state, and is OFF when the discharge tray plate 54 is in the open state.

When the switching plate 48 takes the first posture F1 indicated by the solid line in FIG. 1, the switching plate 48 guides original sheets G along the U path 22A so that the original sheets G are discharged through the border portion 5A onto the first sheet discharge tray 4A. On the other hand, when the switching plate 48 takes the second posture F2 indicated by the two-dot chain line in FIG. 1, the switching plate 48 guides original sheets G along the S path 22B so that the original sheets G are discharged through the opening 5B onto the second sheet discharge tray 4B. In this way, the posture of the switching plate 48 determines whether the original sheets G will be guided to the U path 22A or the S path 22B. The suction roller 50, the sheet feed roller 40, the first conveyance rollers 44, and the second conveyance rollers 46 constitute a conveyance unit 56 for conveying, along the conveyance path 22, the original sheets G that have been placed on the sheet feed tray 2.

The front sensor 13 is disposed at a first detection position Y3 in the sheet feed tray 2. The front sensor 13 is ON when one or more original sheets G is placed on the sheet feed tray 2, and is OFF when no original sheet G is placed on the sheet feed tray 2. The rear sensor 14 is disposed at a second detection position Y4 between the first conveyance rollers 44 and the first reading position Y1 along the conveyance path 22. The rear sensor 14 is ON when an original sheet G is passing through the second detection position Y4 on the conveyance path 22, and is OFF when no original sheet G is passing through the second detection position Y4. Thus, the rear sensor 14 detects an original sheet G passing through the second detection position Y4.

Figure 2:
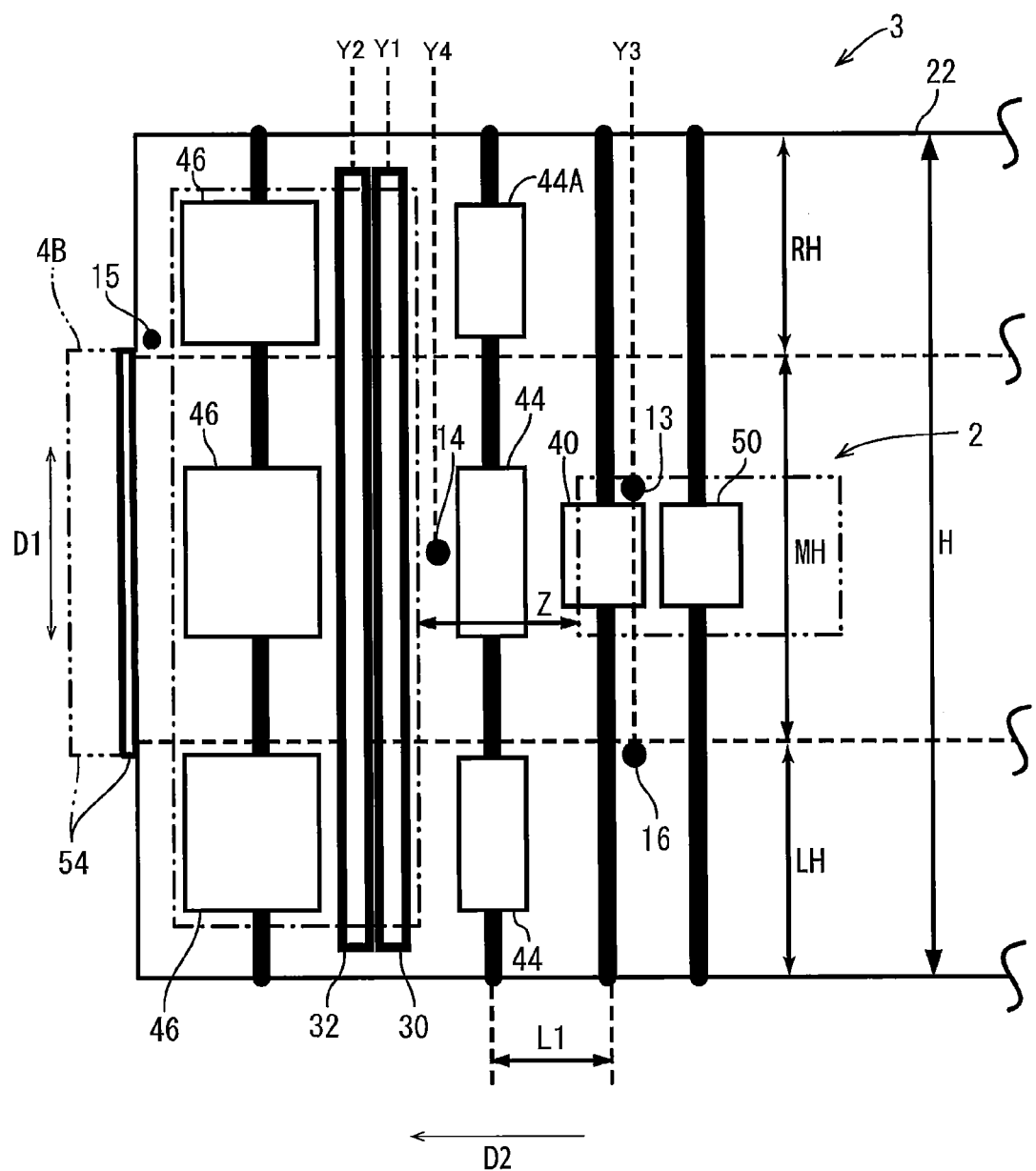
FIG. 2 is a top view schematically showing the inside of a main body in the reading apparatus shown in FIG. 1.

Furthermore, as shown in FIG. 2, not only the front sensor 13 but also a sheet size detection sensor 16 are disposed at the first detection position Y3 in the conveyance direction D2. The sheet size detection sensor 16 is for detecting the widths, in the main scanning direction D1, of original sheets G that are placed on the sheet feed tray 2. In other words, the sheet size detection sensor 16 is for detecting the widths or sizes of the original sheets G that are not yet conveyed by the conveyance unit 56 from the sheet feed tray 2. The sheet size detection sensor 16 is ON when the original sheets G placed on the sheet feed tray 2 are large sheets, and is OFF when the original sheets G are small sheets. It is noted that large sheets are defined as such sheets that have widths in the main scanning direction D1 greater than a prescribed reference width. Small sheets are defined as such sheets that have widths in the main scanning direction D1 smaller than or equal to the reference width. In this example, the large sheets have sizes (large sizes) larger than a prescribed size A6 (width=105 [mm], length=148 [mm]), while the small sheets have sizes (small sizes) smaller than or equal to the size A6. The reference width for discriminating between the large and small sheets is set equal to the width of the opening 5B in the main scanning direction D1. In this example, the reference width is equal to the width of A6-size sheets.

Figure 3:
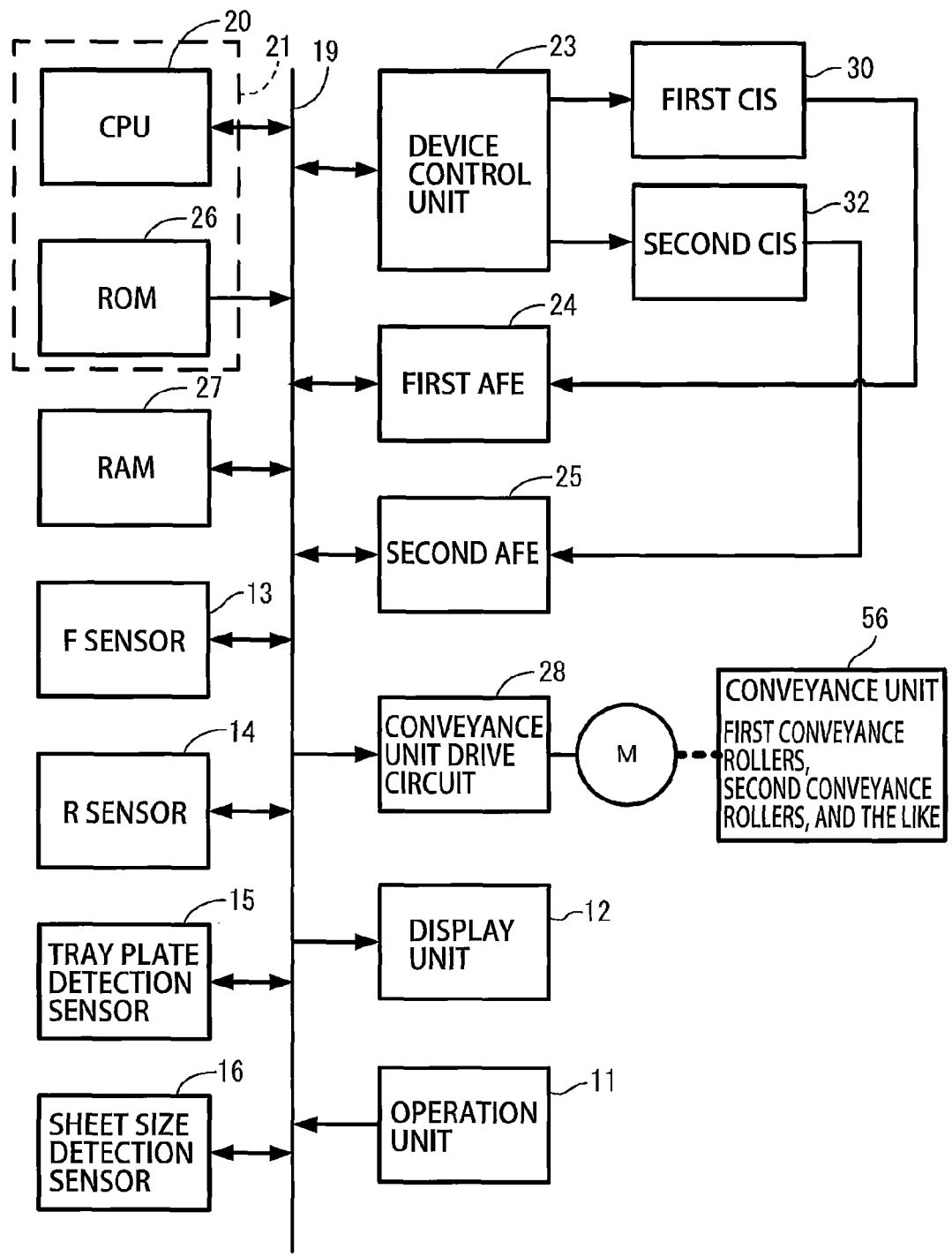
FIG. 3 is a block diagram schematically showing the electrical configuration of the reading apparatus shown in FIG. 1.
Figure 4:
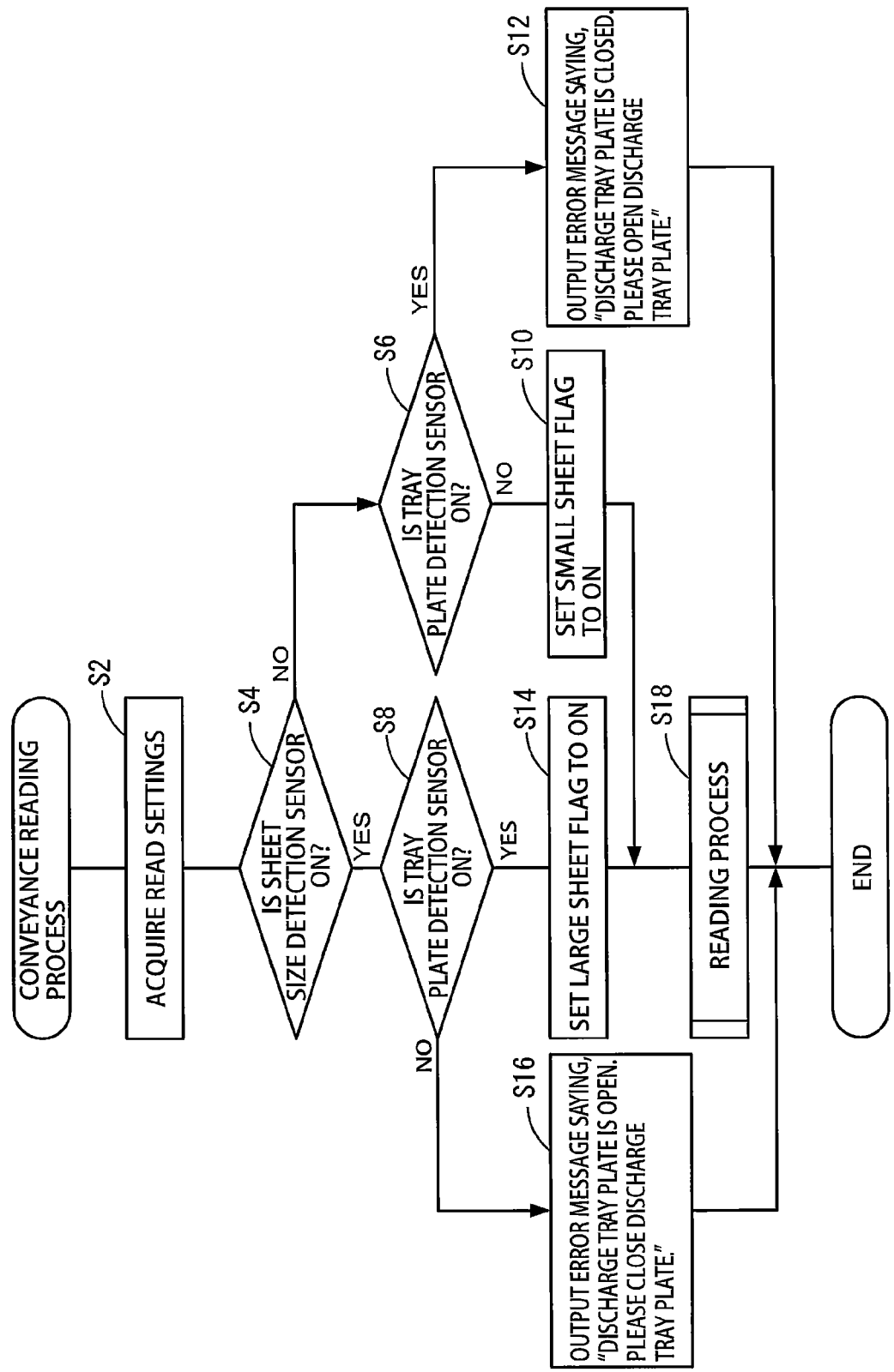
FIG. 4 is a flowchart of a conveyance reading process according to the first embodiment.

As shown in FIG. 3, the reading apparatus 1 is further provided with an operation unit 11 and a display unit 12. The operation unit 11 includes a power switch and various setting buttons, and receives operation instructions and read settings inputted by the user. The display unit 12 includes an LED or a liquid crystal display, and is for displaying the status of the reading apparatus 1.

FIG. 2 is a top view of the inside of the main body 3. The conveyance path 22 has a predetermined width in the main scanning direction D1. The entire region of the conveyance path 22 in the main scanning direction D1 is referred to as a "conveyance region H." A center region MH is defined as center part of the conveyance region H in the main scanning direction D1. The sheet feed tray 2 is in connection with the conveyance path 22 such that when original sheets G are placed on the sheet feed tray 2, the original sheets G are positioned with their centers in the main scanning direction D1 being aligned with the center of the conveyance path 22 in the main scanning direction D1. The entire part of the conveyance region H in the main scanning direction D1 is used to convey large sheets G. Only the center region MH of the conveyance region H is used to convey small sheets G. Hereinafter, in the conveyance region H, as viewed from the upstream side in the conveyance direction D2, a region on the right side of the center region MH is referred to as a right region RH, and a region on the left side of the center region MH as a left region LH.

The center region MH and the discharge tray plate 54 have widths in the main scanning direction D1 that are substantially equal to the reference width. Accordingly, small sheets (indicated by a two-dot chain line in FIG. 2) that are conveyed by only the center region MH should be discharged onto the second sheet discharge tray 4B formed by the discharge tray plate 54. On the other hand, the conveyance path 22A, discharge tray 4A, and border portion 5A have widths in the main scanning direction D1 that are greater than the reference width. So, large sheets (indicated by a one-dot chain line in FIG. 2) that are conveyed by the entire conveyance region H (the center region MH, right region RH, and left region LH) should be discharged onto the first sheet discharge tray 4A.

As shown in FIG. 2, the front sensor 13 and the rear sensor 14 are disposed near the center of the center region MH in the main scanning direction D1. The sheet size detection sensor 16 is disposed in the left region LH at a position near to the boundary between the left region LH and the center region MH in the main scanning direction D1. When large sheets are placed on the sheet feed tray 2, because the large sheets have widths larger than the reference width, the large sheets can reach the position of the sheet size detection sensor 16, thereby turning ON the sheet size detection sensor 16. Contrarily, when small sheets are placed on the sheet feed tray 2, because the small sheets have widths smaller than or equal to the reference width, the small sheets may not reach the position of the sheet size detection sensor 16, thereby turning OFF the sheet size detection sensor 16.

2. Electrical Configuration of Reading Apparatus

As shown in FIG. 3, the reading apparatus 1 includes the central processing unit (referred to as CPU, hereinafter) 20, a ROM 26, a RAM 27, a device control unit 23, a first analog front end (referred to as AFE, hereinafter) 24, a second AFE 25, and a conveyance unit drive circuit 28. To the above components, the operation unit 11, the display unit 12, and the sensors 13 to 16 are connected via a bus 19. As indicated by a broken line 21 in FIG. 3, the CPU 20 and the ROM 26 constitute a control device for controlling the entire part of the reading apparatus 1.

Various programs for controlling an operation of the reading apparatus 1 are prestored in the ROM 26. By executing the programs read from the ROM 26, the CPU 20 controls each part in the reading apparatus 1 and also performs a conveyance reading process according to the present embodiment to be described later. The ROM 26 is further prestored with: various messages, the reference width, and an original sheet size equivalent to the reference width (size A6, in this example).

The device control unit 23 is connected to the CISs 30 and 32. Based on instructions outputted from the CPU 20, the device control unit 23 transmits reading control signals to the CISs 30 and 32. Each of the CISs 30 and 32 reads a corresponding surface of an original sheet G based on the reading control signal inputted from the device control unit 23.

The first AFE 24 is connected to the first CIS 30. The first AFE 24 converts analog read data outputted from the first CIS 30 into digital read data, i.e., digital gradation data. The first AFE 24 stores the digital read data in the RAM 27 via the bus 19. The second AFE 25 is connected to the second CIS 32. The second AFE 25 converts analog read data outputted from the second CIS 32 into digital read data, and stores the digital read data in the RAM 27 via the bus 19. The RAM 27 further stores results of detection by the sheet size detection sensor 16 that indicate whether original sheets G that are placed on the sheet feed tray 2, i.e., that are not yet conveyed by the conveyance unit 56 from the sheet feed tray 2 are large sheets or small sheets.

The conveyance unit drive circuit 28 is connected to the motor M. Based on a pulse signal inputted from the CPU 20, the conveyance unit drive circuit 28 drives the motor M to rotate. Upon receiving one pulse in the pulse signal, the motor M is driven to rotate by a predetermined one step's worth of rotation angle. As the motor M is driven by one step, the rollers constituting the conveyance unit 56 are rotated by prescribed angles, thereby conveying an original sheet G by a prescribed one step's worth of distance along the conveyance path 22. To convey the original sheet G, the CPU 20 transmits a pulse signal to the conveyance unit drive circuit 28, whereupon the conveyance unit 56 conveys the original sheet G by a distance that is equivalent to a value determined by multiplying the number of pulses in the pulse signal and the predetermined one step's worth of distance. Hereinafter, the number of pulses in the pulse signal transmitted from the CPU 20 to the motor M is referred to as a step count. Note that a first step count corresponds to a distance along the conveyance path 22 between the second detection position Y4 and a reading position (first or second reading position Y1 or Y2). A second step count corresponds to a distance along the conveyance path 22 between the reading position (first or second reading position Y1 or Y2) and a discharging position (first or second discharge tray 4A or 4B). A third step count corresponds to a distance along the conveyance path 22 between the second detection position Y4 and the discharging position (first or second discharge tray 4A or 4B).

When a user desires to use the reading apparatus 1 to read a set of original sheets G, the user places the set of original sheets G on the sheet feed tray 2. The set of original sheets G contains at least one original sheet, all of which have the same size. That is, the set of original sheets contains at least one large sheet or at least one small sheet. The user manipulates the operation unit 11 to input his/her instruction (conveyance reading instruction) to start a conveyance reading process. After the reading apparatus 1 starts the conveyance reading process, the user may place one or more additional sheets onto the sheet feed tray 2. Widths of the thus newly-added sheets may be the same with or different from the original sheets that the user has initially placed on the sheet feed tray 2.

3. Conveyance Reading Process

The following describes the conveyance reading process for original sheets G with reference to FIGS. 4 to 9. According to the present embodiment, only front or back surfaces of original sheets G are read by the first CIS 30 or second CIS 32. The CPU 20 starts the conveyance reading process after the CPU 20 confirms by using the front sensor 13 that at least one original sheet G has been placed on the sheet feed tray 2 and a conveyance reading instruction is inputted by a user through the operation unit 11.

After starting the conveyance reading process, the CPU 20 acquires the read settings, such as a type of the original sheets G and a surface of the original sheets G to be read, which have been inputted by the user together with the conveyance reading instruction (S2). Note that when the read settings indicate that the front surfaces of the original sheets G should be read, the first CIS 30 is set as a reading device used for the present scanning operation (reading device relevant for the present job). The first reading position Y1 is set as the reading position based on which the first and second step counts are determined. When the read settings indicate that the back surfaces of the original sheets G should be read, the second CIS 30 is set as a reading device used for the present scanning operation (reading device relevant for the present job). The second reading position Y2 is set as the reading position based on which the first and second step counts are determined.

Then, the CPU 20 checks the states of the sheet size detection sensor 16 and tray plate detection sensor 15. More specifically, the CPU 20 first checks in S4 whether the sheet size detection sensor 16 is ON or OFF. If the sheet size detection sensor 16 is OFF (S4: NO), the CPU 20 detects that original sheets G that are placed on the sheet feed tray 2 are small sheets, and stores the detection results in the RAM 27.

Then, the CPU 20 checks in S6 whether the tray plate detection sensor 15 is ON or OFF. If the tray plate detection sensor 15 is OFF (S6: NO), this indicates that the discharge tray plate 54 is in the open state. The CPU 20 determines that the current status is such that small sheets would be conveyed along the S path 22B. The CPU 20 therefore determines that the state of the tray plate detection sensor 15 is consistent with the state of the sheet size detection sensor 16. In this case, in S10, the CPU 20 sets to ON a small sheet flag, indicating that original sheets G to be scanned during the present job are of the small size. When the small sheet flag is thus set to ON, the second sheet discharge tray 4B is set as a sheet discharge tray to be used during the present job. So, the position of the second sheet discharge tray 4B is set as the discharging position based on which the second and third step counts are determined. Then, in S18, the CPU 20 performs a reading process to be described later.

On the other hand, if the tray plate detection sensor 15 is ON (S6: YES), this indicates that the discharge tray plate 54 is in the closed state. So, the CPU 20 determines that the current status is such that small sheets G would be conveyed along the U path 22A. If small sheets are conveyed along the U path 22A, the small sheets are apt to become damaged by failing to be conveyed along the curved portion 60 in the U path 22A, or are apt to be largely bent and damaged while being conveyed along the curved portion 60. So, in S12, without starting to convey the original sheets G, the CPU 20 displays on the display unit 12 an error message saying, "The discharge tray plate is closed. Please open the discharge tray plate." Then, the CPU 20 ends the conveyance reading process.

On the other hand, if the sheet size detection sensor 16 is ON (S4: YES), the CPU 20 detects that original sheets G that are placed on the sheet feed tray 2 are large sheets, and stores the detection results in the RAM 27. Then, the CPU 20 checks in S8 whether the tray plate detection sensor 15 is ON or OFF. If the tray plate detection sensor 15 is ON (S8: YES), this indicates that the discharge tray plate 54 is in the closed state. So, the CPU 20 determines that the current status is such that large sheets G would be conveyed along the U path 22A. The CPU 20 therefore determines that the state of the tray plate detection sensor 15 is consistent with the state of the sheet size detection sensor 16. In this case, the CPU 20 sets to ON a large sheet flag, indicating that original sheets G to be scanned during the present job are of the large size (S14). When the large sheet flag is thus set to ON, the first sheet discharge tray 4A is set as a sheet discharge tray to be used during the present job. So, the position of the first sheet discharge tray 4A is set as the discharging position based on which the second and third step counts are determined. Then, in S18, the CPU 20 performs the reading process.

On the other hand, if tray plate detection sensor 15 is OFF (S8: NO), this indicates that the discharge tray plate 54 is in the open state. The CPU 20 determines that the current status is such that large original sheets would be conveyed along the S path 22B. If large sheets were conveyed along the S path 22B, the large sheets G cannot pass through the opening 5B, and will become jammed and damaged. Therefore, in S16, without starting to convey the original sheets G, the CPU 20 displays on the display unit 12 an error message saying, "The discharge tray plate is open. Please close the discharge tray plate." Then, the CPU 20 ends the conveyance reading process.

(Reading Process)

Figure 5:
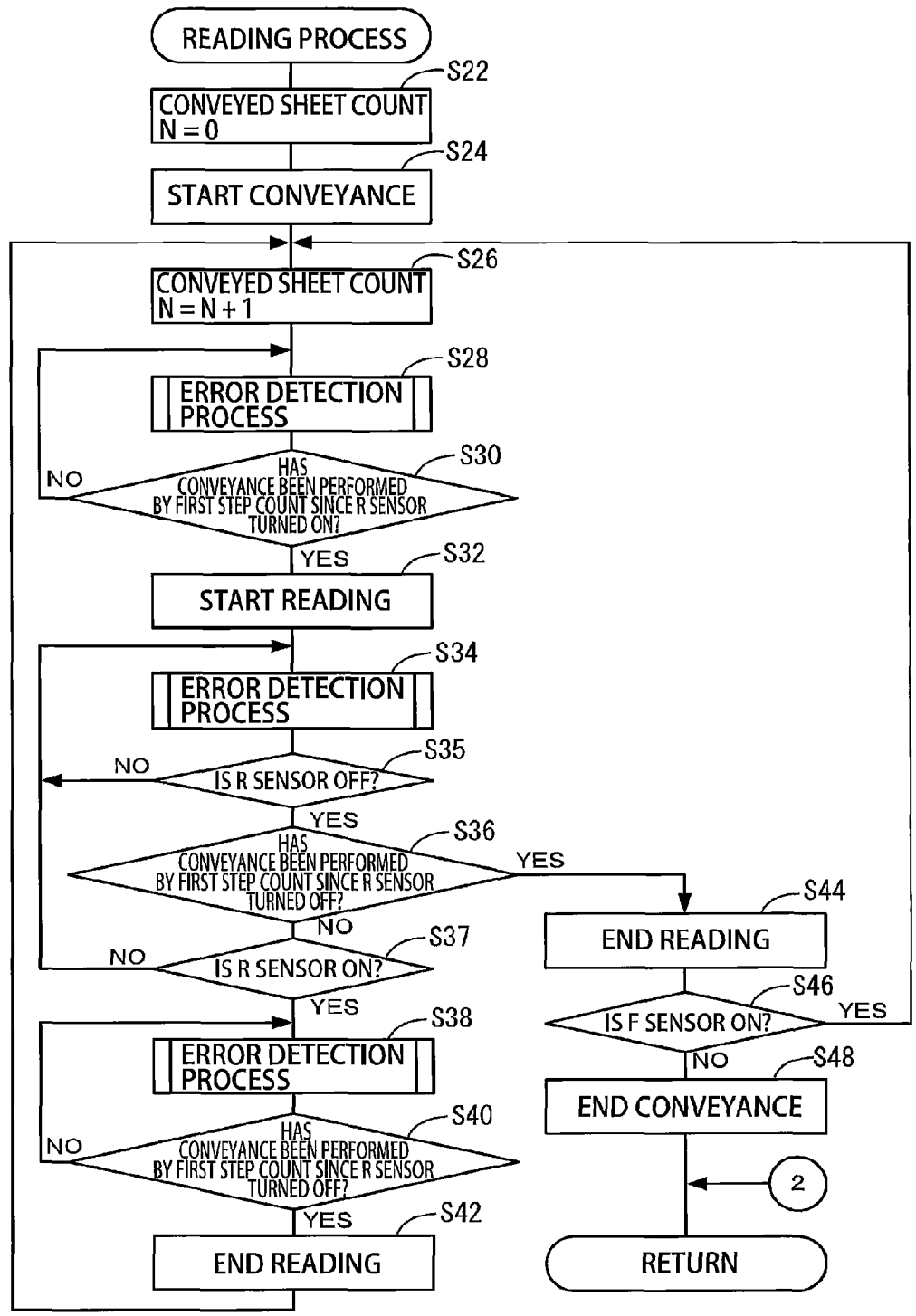
FIG. 5 is a flowchart of a reading process shown in FIG. 4.

Next, the reading process in S18 will be described. As shown in FIG. 5, during the reading process, first in S22, the CPU 20 resets to zero (0) a conveyed sheet count N indicating the number of original sheets G that have been conveyed since the reading process started in the current job. The CPU 20 then instructs in S24 the conveyance unit 56 to start conveyance of original sheets G. When conveyance of original sheets G is started, the CPU 20 increments the conveyed sheet count N by one in S26. Then, the CPU 20 performs an error detection process in S28. A sheet G that is conveyed N-th after the conveyance is started in S24 will be referred to as "N-th sheet" hereinafter, wherein N is an integer.

(Error Detection Process)

Figure 6:
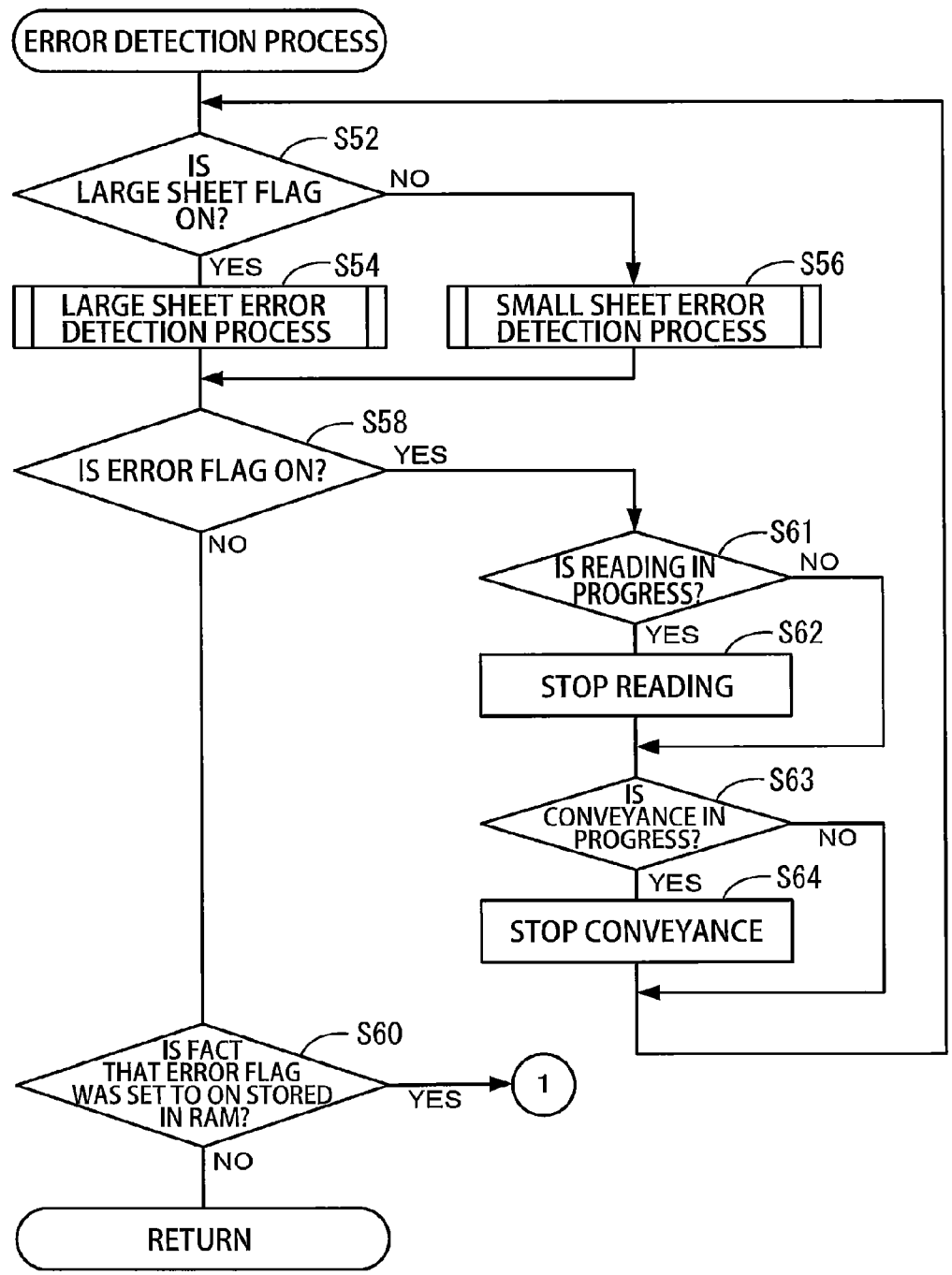
FIG. 6 is a flowchart showing part in each of error detection processes shown in FIG. 5.

The error detection process will be described with reference to FIGS. 6 to 9. As shown in FIG. 6, in the error detection process, the CPU 20 first checks in S52 the flags indicating the sheet size of the original sheets G to be read in the present job. If the large sheet flag is ON (S52: YES), the CPU 20 performs a large sheet error detection process in S54 shown in FIG. 8. On the other hand, if the small sheet flag is ON (S52: NO), the CPU 20 performs a small sheet error detection process in S56 shown in FIG. 9.

(Large Sheet Error Detection Process)

Figure 8:
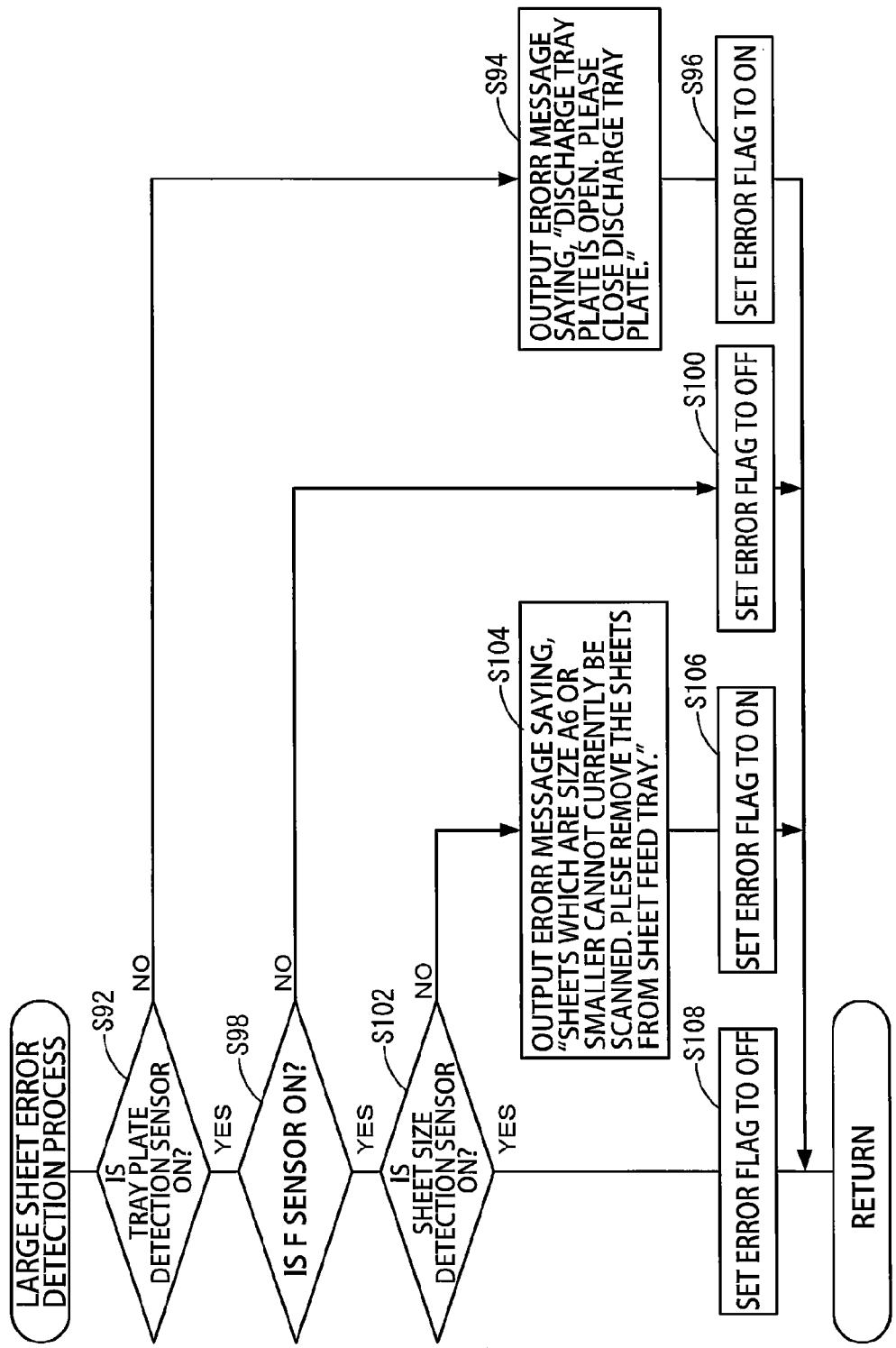
FIG. 8 is a flowchart showing each of large sheet error detection processes shown in FIGS. 6 and 7.

As shown in FIG. 8, during the large sheet error detection process, the CPU 20 first checks in S92 the state of the tray plate detection sensor 15. If the tray plate detection sensor 15 is OFF (S92: NO), this indicates that the discharge tray plate 54 is in the open state and the switching plate 48 is accordingly in the second posture F2. The CPU 20 therefore determines that the current status is such that large sheets would be erroneously conveyed along the S path 22B. So, in S94, the CPU 20 displays on the display unit 12 an error message saying, "The discharge tray plate is open. Please close the discharge tray plate." Then, in S96, the CPU 20 sets to ON an error flag indicating that an error has occurred, stores in the RAM 27 the fact that the error flag has been set to ON, and ends the large sheet error detection process.

On the other hand, if the tray plate detection sensor 15 is ON (S92: YES), this indicates that the discharge tray plate 54 is in the closed state and the switching plate 48 is accordingly in the first posture F1. The CPU 20 then checks in S98 the state of the F sensor 13. If the F sensor 13 is OFF (S98: NO), this indicates that there are no more original sheets G on the sheet feed tray 2. So, the CPU 20 sets in S100 the error flag to OFF, and ends the large sheet error detection process.

If the F sensor 13 is ON (S98: YES), this indicates that one or more original sheets G are on the sheet feed tray 2. The CPU 20 then checks in S102 the state of the sheet size detection sensor 16. If the sheet size detection sensor 16 is OFF (S102: NO), the CPU 20 determines that the user has newly placed one or more small sheets on the sheet feed tray 2 while large sheet conveyance is in progress. In this case, if conveyance by the conveyance unit 56 were to continue, the newly-added small sheets would be conveyed along the U path 22A and could become damaged. So, in S104, the CPU 20 displays on the display unit 12 an error message saying, "Sheets which are of size A6 or smaller cannot currently be scanned. Please remove the sheets from the sheet feed tray." Then, in S106, the CPU 20 sets the error flag to ON, stores in the RAM 27 the fact that the error flag has been set to ON, and ends the large sheet error detection process.

On the other hand, if the sheet size detection sensor 16 is ON (S102: YES), the CPU 20 determines that there are one or more large sheets remaining on the sheet feed tray 2. In this case, the CPU 20 sets the error flag to OFF in S108 and ends the large sheet error detection process.

(Small Sheet Error Detection Process)

Figure 9:
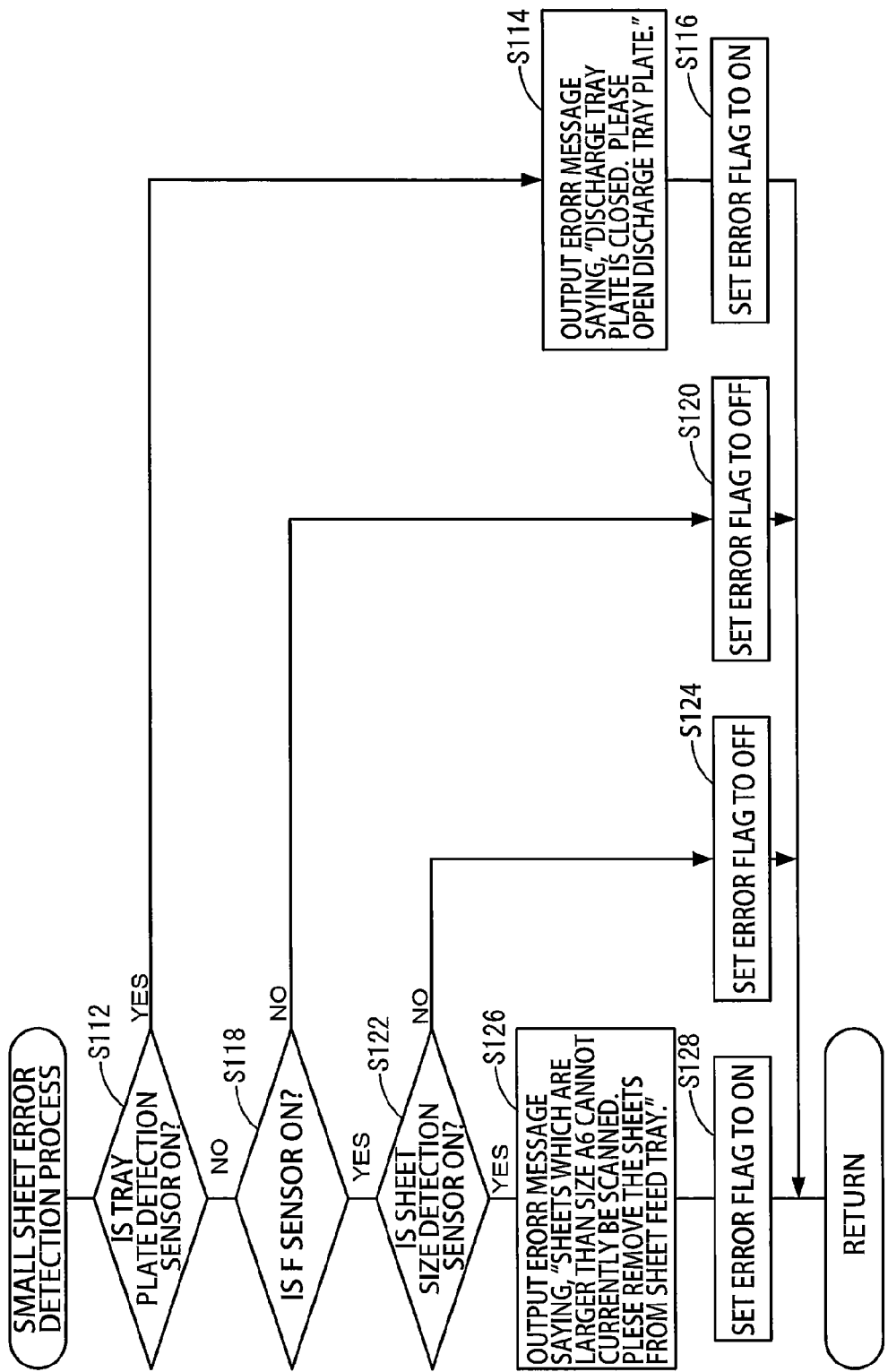
FIG. 9 is a flowchart showing each of small sheet error detection processes shown in FIGS. 6 and 7.

Next, the small sheet error detection process, shown in FIG. 9, will be described. During the small sheet error detection process, the CPU 20 first checks in S112 the state of the tray plate detection sensor 15. If the tray plate detection sensor 15 is ON (S112: YES), this indicates that the discharge tray plate 54 is in the closed state and the switching plate 48 is accordingly in the first posture F1. So, the CPU 20 determines that the current status is such that small sheets would be erroneously conveyed along the U path 22A. So, in S114, the CPU 20 displays on the display unit 12 an error message saying, "The discharge tray plate is closed. Please open the discharge tray plate." Then, in S116, the CPU 20 sets the error flag to ON, stores in the RAM 27 the fact that the error flag has been set to ON, and ends the small sheet error detection process.

On the other hand, if the tray plate detection sensor 15 is OFF (S112: NO), this indicates that the discharge tray plate 54 is in the open state and the switching plate 48 is accordingly in the second posture F2. The CPU 20 then checks the state of the F sensor 13 in S118. If the F sensor 13 is OFF (S118: NO), this indicates that no more original sheets G remain on the sheet feed tray 2. So, the CPU 20 sets the error flag to OFF in S120, and ends the small sheet error detection process.

If the F sensor 13 is ON (S118: YES), on the other hand, this indicates that one or more original sheets G are on the sheet feed tray 2. The CPU 20 then checks the state of the sheet size detection sensor 16 in S122. If the sheet size detection sensor 16 is OFF (S122: NO), the CPU 20 determines that one or more small sheets remain on the sheet feed tray 2. In this case, the CPU 20 sets the error flag to OFF in S124 and ends the small sheet error detection process.

On the other hand, if the sheet size detection sensor 16 is ON (S122: YES), the CPU 20 determines that the user has newly placed one or more large sheets on the sheet feed tray 2 while small sheet conveyance is in progress. In this case, if conveyance by the conveyance unit 56 were to continue, the newly-added large sheets would be conveyed along the S path 22B and could become damaged. So, in S126, the CPU 20 displays on the display unit 12 an error message saying, "Sheets which are larger than size A6 cannot currently be scanned. Please remove the sheets from the sheet feed tray." Then, in S128, the CPU 20 sets the error flag to ON, stores in the RAM 27 the fact that the error flag has been set to ON, and ends the small sheet error detection process.

After ending the large sheet error detection process or the small sheet error detection process, the CPU 20 returns to the error detection process shown in FIG. 6, and checks the error flag information in S58 and S60. If the error flag is OFF (S58: NO) and if, in addition, there is not stored in the RAM 27 the fact that the error flag was set to ON during the error detection process (S60: NO), the CPU 20 determines that conveyance of original sheets G should not be stopped, and ends the error detection process normally.

On the other hand, if the error flag is ON (S58: YES), the CPU 20 determines that the conveyance unit 56 should stop conveyance of original sheets. That is, the CPU 20 determines: that the conveyance unit 56 should stop conveying original sheets G that the conveyance unit 56 is currently conveying; and that the conveyance unit 56 should not start conveying original sheets that are remaining on the sheet feed tray 2. Then, in S61, the CPU 20 checks, via the device control unit 23, whether the reading device relevant for the present job (CIS 30 or 32) is currently executing a reading operation. If reading is in progress (S61: YES), the CPU 20 instructs the reading device (CIS 30 or 32) to stop the reading operation in S62. On the other hand, if reading is not in progress (S61: NO, S62), the CPU 20 proceeds to S63.

In S63, the CPU 20 checks whether the conveyance unit 56 is currently performing conveyance of original sheets G. If conveyance is in progress (S63: YES), the CPU 20 instructs the conveyance unit 56 to stop conveyance in S64. When the conveyance unit 56 has stopped conveyance (S63: NO, S64), the CPU 20 repeats execution starting from the process of S52 until appropriate measures are taken by the user in response to the error messages displayed on the display unit 12 and the error flag switches from ON to OFF. The appropriate measures by the user include, for example, opening or closing the discharge tray plate 54, and removing original sheets G from the sheet feed tray 2.

When appropriate measures are taken by the user and the error flag switches from ON to OFF (S58: NO), the CPU 20 proceeds to the process shown in FIG. 7 because there is stored in the RAM 27 the fact that the error flag was set to ON during the error detection process (S60: YES).

Figure 7:
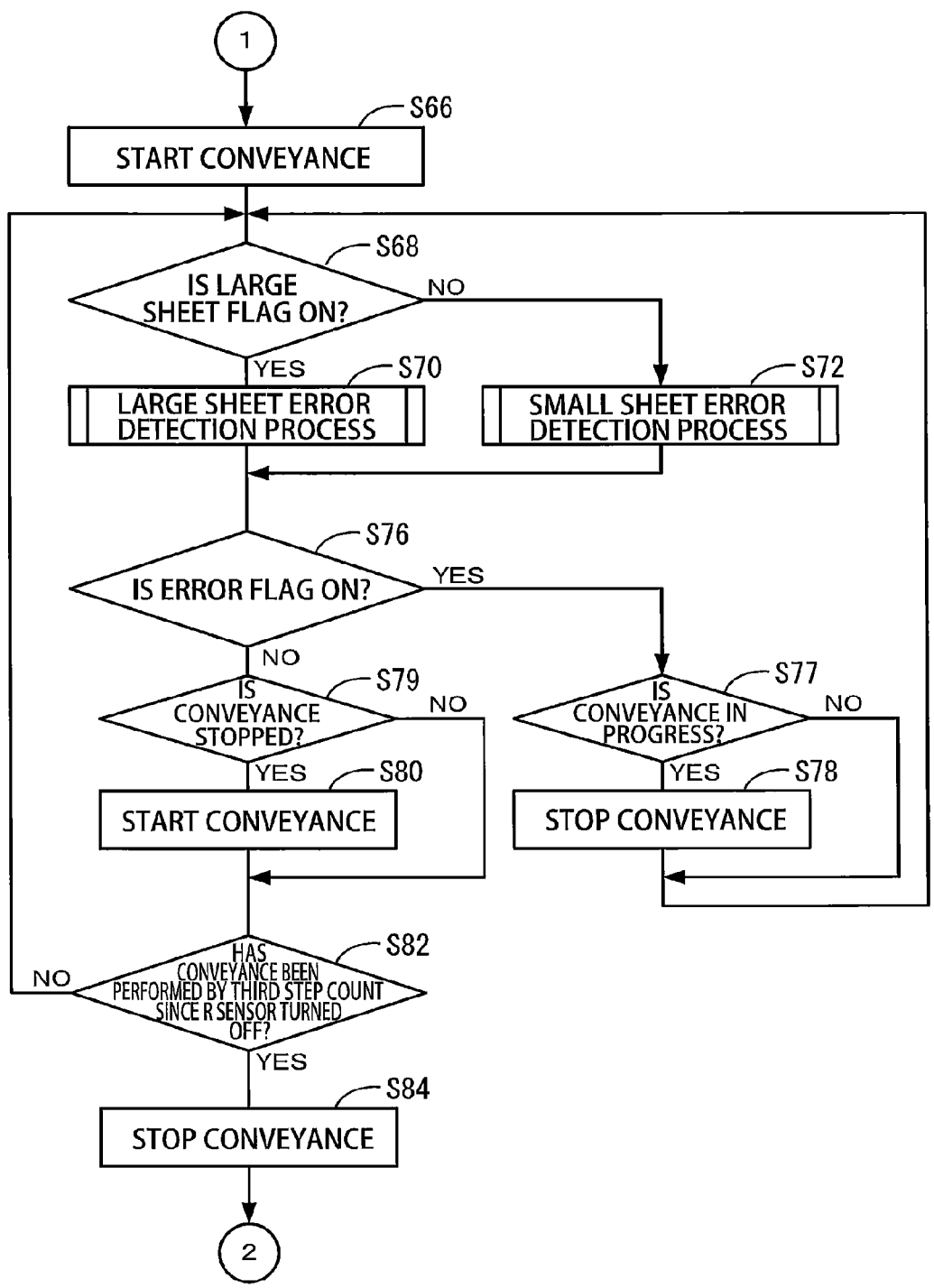
FIG. 7 is a flowchart showing remaining part of the error detection process.

FIG. 7 shows the process that is executed after the error flag switches from ON to OFF. In the process shown in FIG. 7, in S66, the CPU 20 again instructs the conveyance unit 56 to start conveyance of original sheets G, and executes processes of S68 to S72, which are the same as the processes of S52 to S56. Then, the CPU 20 again checks the error flag in S76. It is noted that the error flag again switches from OFF to ON in S70 or S72 if a new error occurs after the appropriate measures were taken by the user. In such a case, determination in S76 becomes affirmative (S76: YES). The CPU 20 therefore determines that the conveyance unit 56 should stop conveyance of original sheets G. The CPU 20 executes the processes of S77 and S78, which are the same as those of S63 and S64. Then, the CPU 20 repeats execution starting from the process of S68 until appropriate measures are taken by the user in response to error messages displayed on the display unit 12 and the error flag switches from ON to OFF.

On the other hand, if the error flag is OFF (S76: NO), the CPU 20 checks in S79 whether the conveyance unit 56 is currently stopping conveyance of original sheets G. If the conveyance unit 56 is now stopping conveyance (S79: YES), the CPU 20 again instructs the conveyance unit 56 to start conveyance of original sheets G in S80. When the conveyance unit 56 begins conveying original sheets G (S79: NO, S80), the CPU 20 checks in S82 whether the R sensor 14 has turned OFF and if so, whether conveyance has been performed by the third step count since the R sensor 14 turned OFF.

If the R sensor 14 has not yet turned OFF, or if the R sensor 14 has turned OFF but conveyance has not yet been performed by the third step count after the R sensor 14 turned OFF (S82: NO), this indicates that the trailing edge of the N-th sheet G has not yet reaches the R sensor 14 or that the N-th sheet G has not yet been discharged onto a sheet discharge tray (4A or 4B) relevant for the present job. The CPU 20 therefore repeats execution from the process of S68. On the other hand, if the R sensor 14 has turned OFF and, in addition, conveyance has been performed by the third step count since the R sensor 14 turned OFF (S82: YES), this indicates that the N-th sheet has been discharged onto the sheet discharge tray (4A or 4B) relevant for the present job. Therefore, in S84, the CPU 20 instructs the conveyance unit 56 to stop conveyance of original sheets G, terminating the error detection process and ending the reading process and the conveyance reading process. As a result, the present job is terminated.

As shown in FIG. 5, during the reading process, when the error detection process of S28 ends normally, that is, when the judging process of S60 in the error detection process (FIG. 6) becomes negative (S60: NO), the CPU 20 checks in S30 whether the R sensor 14 has turned ON and if so, whether conveyance has been performed by the first step count since the R sensor 14 turned ON. If the R sensor 14 has not yet turned ON, or if the R sensor 14 has turned ON but conveyance has not yet been performed by the first step count since the R sensor 14 turned ON (S30: NO), this indicates that the leading edge of the N-th sheet has not yet reached the R sensor 14 or that the leading edge of the N-th sheet has not yet reached the reading device (CIS 30 or 32) relevant for the present job. The CPU 20 therefore repeats execution from the process of S28.

On the other hand, if the R sensor 14 has turned ON and, in addition, conveyance has been performed by the first step count since the R sensor turned ON (S30: YES), this indicates that the leading edge of the N-th sheet has reached the reading device (CIS 30 or 32) relevant for the present job. Therefore, the CPU 20 instructs in S32 the reading device (CIS 30 or 32) relevant for the present job to perform a reading operation based on the acquired read settings.

When reading of the original sheet G starts, the CPU 20 again performs the error detection process in S34. When the error detection process ends normally, the CPU 20 checks in S35 whether the R sensor 14 is OFF. If the R sensor 14 is not OFF (S35: NO), this indicates that the trailing edge of the N-th sheet has not yet reached the R sensor 14. Therefore, the CPU 20 repeats execution starting from the process of S34. Assume that the R sensor 14 turns OFF at a time T1. In other words, the trailing edge of the N-th sheet passes by the R sensor 14 at the time T1. When the R sensor 14 turns OFF at the time T1 (S35: YES), the CPU 20 further waits until either of the following events occurs: conveyance has been performed by the first step count since the time T1 (S36: YES), or the R sensor 14 again switches ON (S37: YES).

While neither of the events has occurred (S36: NO, S37: NO), the CPU 20 repeats execution starting from the process of S34. If the R sensor 14 switches ON before conveyance has been performed by the first step count since the time T1 (S36: NO, S37: YES), this indicates that the leading edge of the next sheet ((N+1)-th sheet) arrives at the R sensor 14 before the trailing edge of the N-th sheet arrives at the reading device (CIS 30 or 32) relevant for the present job. Therefore, the CPU 20 again performs the error detection process in S38. If the error detection process in S38 ends normally, the CPU 20 checks again in S40 whether the conveyance has been performed by the first step count since the time T1. If conveyance has not yet been performed by the first step count since the time T1 (S40: NO), this indicates that the trailing edge of the N-th sheet has not yet reached the reading device (CIS 30 or 32) relevant for the present job. Therefore, the CPU 20 repeats execution starting from the process of S38.

If, however, conveyance has been performed by the first step count since the time T1 (S40: YES), this indicates that the trailing edge of the N-th sheet has reached the reading device (CIS 30 or 32) relevant for the present job. The CPU 20 therefore instructs the reading device relevant for the present job (CIS 30 or 32) to stop the reading operation in S42, and repeats execution starting from the process of S26.

Before the R sensor 14 turns ON again, if conveyance has been performed by the first step count since the time T1 (S36: YES), this indicates that the trailing edge of the N-th sheet arrives at the reading device (CIS 30 or 32) relevant for the present job before the leading edge of the next sheet ((N+1)-th sheet) reaches the R sensor 14. Therefore, the CPU 20 instructs the reading device relevant for the present job (CIS 30 or 32) to stop the reading operation in S44. The CPU 20 then checks the state of the F sensor 13 in S46. If the F sensor 13 is ON (S46: YES), this indicates that one or more original sheets G are remaining on the sheet feed tray 2. So, the CPU 20 repeats execution starting from the process of S26 for the next original sheet G ((N+1)-th sheet).

On the other hand, if the F sensor 13 is OFF (S46: NO), this indicates that there are no more original sheets G remaining on the sheet feed tray 2. So, in S48, the CPU 20 instructs the conveyance unit 56 to perform conveyance further by the second step count and to stop conveyance thereafter. As a result, the N-th sheet is discharged onto the sheet discharging tray (4A or 4B) relevant for the present job. Then, the CPU 20 ends the reading process and the conveyance reading process, thereby ending the present job.

4. Operations of the Present Embodiment (1) With the reading apparatus 1 of the present embodiment, when conveyance of original sheets G starts, the error detection process is performed. In the error detection process, the tray plate detection sensor 15 is used to acquire data related to the posture of the switching plate 48. The data related to the posture of the switching plate 48 indicates the sheet size of an original sheet that the conveyance unit 56 is currently conveying. In addition, if another original sheet G is placed on the sheet feed tray 2, the sheet size detection sensor 16 is used to determine the sheet size of the original sheet G that is placed on the sheet feed tray 2 and therefore that is not yet conveyed by the conveyance unit 56. The error flag is set to ON or OFF depending on the data related to the posture of the switching plate 48 and the size of the not-yet-conveyed original sheet G. If the error flag is set to ON, conveyance of original sheets is stopped. That is, conveyance of an original sheet G that is currently being conveyed (currently-being-conveyed original sheet G) is stopped, and conveyance of an original sheet that is not yet conveyed from the sheet feed tray 2 (not-yet-conveyed original sheet G) is not started. By stopping conveyance of original sheets G, the reading apparatus 1 can prevent possible occurrence of a jam that may occur due to the sheet size, specifically the sheet width, of the original sheets G, and can prevent possible damage of the original sheets G (both of the currently-being-conveyed sheet and the not-yet-conveyed sheet) that may occur due to the occurrence of the jam.

(2) More specifically, if a large sheet were conveyed along the S path 22B, the large sheet would be unable to pass through the opening 5B and would become jammed. In the embodiment, therefore, if a large sheet is newly placed on the sheet feed tray 2 while the switching plate 48 is in the second posture F2, conveyance by the conveyance unit 56 is stopped. Therefore, the large sheet is prevented from subsequently being conveyed along the S path 22B, and from becoming damaged.

(3) If a small sheet were conveyed along the U path 22A, the small sheet would become bent when conveyed along the curved portion 60, or would be unable to be conveyed properly along the curved portion 60 and become jammed. In the embodiment, therefore, if a small sheet is newly placed on the sheet feed tray 2 while the switching plate 48 is in the first posture F1, conveyance by the conveyance unit 56 is stopped. Therefore, the small sheet is prevented from subsequently being conveyed along the U path 22A, and from becoming damaged.

(4) In order to read a plurality of original sheets G in succession using the reading apparatus 1 of the present embodiment, the sheet size detection sensor 16 is used to detect the sheet size of the first original sheet G that is to be read first among the plurality of original sheets G. So, the flag indicating the sheet size of the first original sheet G can be set before the conveyance unit 56 starts conveying the first original sheet G. During the error detection process, the sheet size detection sensor 16 is also used to detect the sheet size of a succeeding original sheet G that is remaining on the sheet feed tray 2 when the first original sheet G is being conveyed. By using the same sheet size detection sensor 16 to detect the sheet size of both the first original sheet G and the succeeding original sheet G, sheet sizes can be detected more accurately than if different sensors are used.

(5) After conveyance of the first original sheet G has been started, while the second or subsequent original sheet G remains on the sheet feed tray 2, the sheet size of the second or subsequent original sheet G is detected by using the sheet size detection sensor 16. Instead of using the sheet size detection sensor 16, the sheet size of a preceding original sheet G that is currently being conveyed is determined by using data related to the posture of the switching plate 48 that is acquired using the tray plate detection sensor 15. Therefore, the sheet size of the preceding original sheet G that is currently being conveyed can be acquired rapidly.

<Second Embodiment>

A second embodiment will be described with reference to FIG. 10.

According to the second embodiment, during the large sheet error detection process, data related to the posture of the switching plate 48 is acquired using the tray plate detection sensor 15, similarly to the first embodiment. However, contrarily to the first embodiment, no check is performed as to whether one or more original sheets G remain on the sheet feed tray 2. In addition, even if one or more original sheets G remain on the sheet feed tray 2, no check is performed on the sheet size of the remaining original sheets G. In the description below, descriptions of the contents the same as those of the first embodiment have been omitted.

1. Large Sheet Error Detection Process

Figure 10:
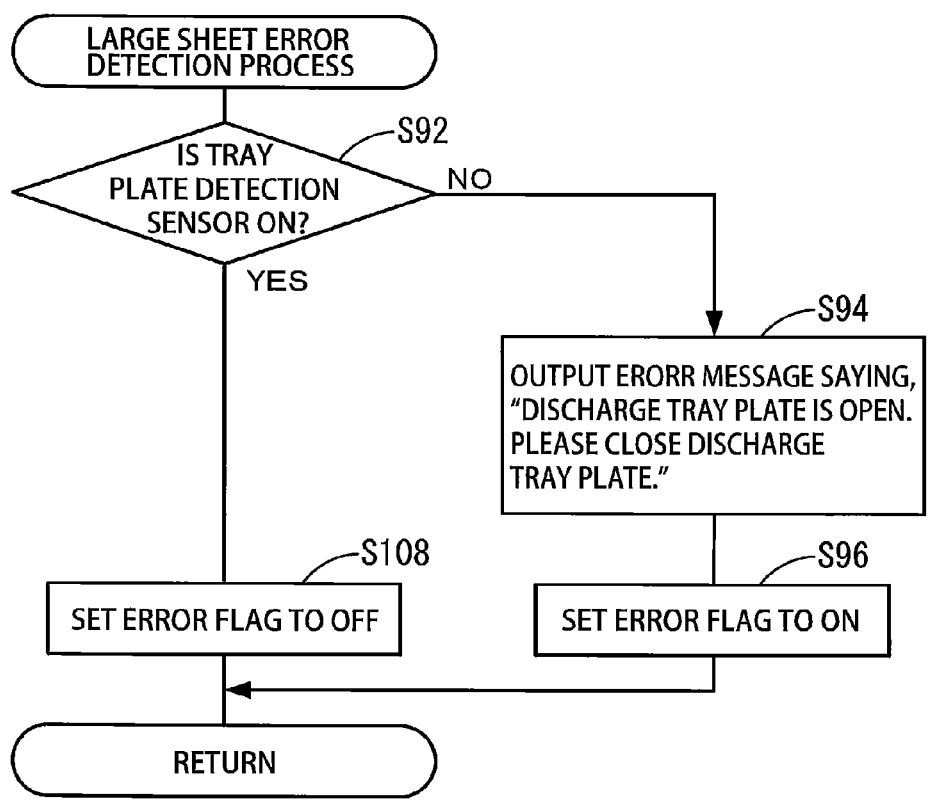
FIG. 10 is a flowchart of the large sheet error detection process according to a second embodiment.

As shown in FIG. 10, when the large sheet error detection process starts, the CPU 20 checks in S92 the state of the tray plate detection sensor 15. If the tray plate detection sensor 15 is OFF (S92: NO), in S94, the CPU 20 displays on the display unit 12 an error message saying, "The discharge tray plate is open. Please close the discharge tray plate." Then, in S96, the CPU 20 sets to ON an error flag indicating that an error has occurred, stores in the RAM 27 the fact that the error flag has been set to ON, and ends the large sheet error detection process.

On the other hand, if the tray plate detection sensor 15 is ON (S92: YES), in S108, the CPU 20 sets the error flag to OFF, without checking the states of the F sensor 13 and sheet size detection sensor 16. In other words, without checking the states of the F sensor 13 and sheet size detection sensor 16, the CPU 20 sets the error flag to OFF and determines that conveyance of original sheets G should not be stopped, and ends the large sheet error detection process.

2. Operations of the Present Embodiment (1) During the large sheet error detection process according to the present embodiment, if the switching plate 48 is detected as being in the first posture F1, wherein the switching plate 48 guides original sheets G along the U path 22A to the first sheet discharge tray 4A, the error flag is not set to ON, letting the conveyance unit 56 continue conveying original sheets G if original sheets G remain on the sheet feed tray 2.

(2) Regardless of whether the original sheets G placed on the sheet feed tray 2 are large or small sheets, the original sheets G can pass through the border portion 5A between the U path 22A and the first sheet discharge tray 4A and can be discharged onto the first sheet discharge tray 4A. Moreover, from the user's perspective, letting small sheets be read and conveyed along the U path 22A is more convenient than prohibiting the small sheets from being read, even though the small sheets are bent slightly. According to the present embodiment, conveyance of original sheets G continues even if there is a possibility that small sheets will be conveyed along the U path 22A. The present embodiment is more convenient than the first embodiment wherein small sheets are prohibited from being conveyed along the U path 22A.

<Other Embodiments>

While the invention has been described in detail with reference to the embodiments thereof, it would be apparent to those skilled in the art that various changes and modifications may be made therein without departing from the spirit of the invention.

(1) For example, according to the above-described embodiments, the reading apparatus 1 has a scanner function. However, the present invention is not limited to this example. For example, the present invention may be applied to a multifunction peripheral having a printer function, copy function, facsimile function, and other functions.

(2) According to the above embodiments, the reading apparatus 1 has a single CPU 20 that executes various processes in the conveyance reading process. However, the present invention is not limited to this example. For example, a plurality of CPUs may be employed for executing each part in the conveyance reading process. Or, one or more hardware circuit such as ASIC (Application Specific Integrated Circuit) may be employed for executing each part in the conveyance reading process. Or, one or more CPU and one or more ASIC may be employed to execute each part in the conveyance reading process.

(3) The program executed by the CPU 20 is not necessarily stored in the ROM 26. The program may be stored in the CPU 20 or any other storage device.

(4) In order to read a plurality of original sheets G in succession according to the above-described embodiments, after conveyance of the first original sheet has been started and while the second or subsequent original sheet G remains on the sheet feed tray 2, the sheet size of a preceding original sheet G that the conveyance unit 56 is currently conveying is determined based on data related to the posture of the switching plate 48. This data related to the posture of the switching plate 48 is detected by using the tray plate detection sensor 15 while the preceding original sheet G is being conveyed. More specifically, in S92 and S112, the CPU 20 acquires data related to the posture of the switching plate 48 detected by the tray plate detection sensor 15, and determines, based on this data, the sheet size of the preceding original sheet G that is currently being conveyed. However, the present invention is not limited to this configuration. It is noted that as described already, in S4 (FIG. 4), S102 (FIG. 8), and S122 (FIG. 9), the sheet size of original sheets G that are placed on the sheet feed tray 2, i.e., that are not yet conveyed from the sheet feed tray 2 is detected by using the sheet size detection sensor 16, and the detection results are stored in the RAM 27. Therefore, in S92 and S112, the CPU 20 may determine, based on the detection results stored in the RAM 27, the sheet size of a preceding original sheet G that is currently being conveyed. In this way, the sheet size of the preceding sheet that is currently being conveyed may be determined not based on data related to the posture of the switching plate 48 detected by the tray plate detection sensor 15, but based on data that has been detected by the sheet size detection sensor 16 and that has been stored in the RAM 27.

(5) In the above-described first embodiment, the CPU 20 checks the state of the sheet size detection sensor 16 in S102. If the sheet size detection sensor 16 is OFF (S102: NO), in S104, the CPU 20 displays on the display unit 12 an error message saying, "Sheets which are size A6 or smaller cannot currently be scanned. Please remove the sheets from the sheet feed tray." The CPU 20 then sets the error flag to ON in S106. However, the present invention is not limited to this configuration. For example, in S104, instead of displaying the error message, the CPU 20 may display a warning message saying, "Sheets may be bent slightly." In S106, the CPU 20 may set the error flag to OFF, rather than to ON. This modification is suitable for the case where it is desirable to continue conveying original sheets G similarly as in the second embodiment.

(6) In the above-described embodiments, the sheet feed roller 40 employs the one-way clutch mechanism. However, the present invention is not limited to this configuration. The present invention may be applied to reading apparatuses which do not employ the one-way clutch mechanism.

What is claimed is:
1. An image reading apparatus comprising:
an original sheet placing unit;
a width detecting unit configured to detect a width of an original sheet that is placed on the original sheet placing unit;
a conveyance unit configured to convey the original sheet from the original sheet placing unit;
a reading unit configured to read the original sheet that is being conveyed by the conveyance unit;
a conveyance path switching unit configured to switch, between a first conveyance path and a second conveyance path, a conveyance path to which the conveyance unit is to guide the original sheet, the first conveyance path leading to a first discharge port, the second conveyance path leading to a second discharge port, a width of the second discharge port defined in a width direction of the original sheet being smaller than a width of the first discharge port defined in the width direction of the original sheet; and
a control device configured to:
acquire conveyance path switching information indicating whether the conveyance path switching unit has switched the conveyance path to the first conveyance path or the second conveyance path;
judge, based on detection results by the width detecting unit, whether a type of an original sheet that is currently placed on the original sheet placing unit and that is not yet conveyed by the conveyance unit from the original sheet placing unit is a first type or a second type, first type original sheets having widths greater than or equal to a prescribed reference width, second type original sheets having widths smaller than the prescribed reference width, the prescribed reference width being equal to the width of the second discharge port; and
determine, based on both of the conveyance path switching information and the type of the not-yet-conveyed original sheet, whether the conveyance unit should stop conveyance of a preceding original sheet that the conveyance unit is currently conveying.

2. The image reading apparatus as claimed in claim 1, wherein the control device determines that the conveyance unit should stop conveyance of the currently-being-conveyed original sheet if the conveyance path switching information indicates that the conveyance path switching unit has switched the conveyance path to the second conveyance path and the not-yet-conveyed original sheet is of the first type, and the control device causes the conveyance unit to stop conveyance of the currently-being-conveyed original sheet if the control device determines that the conveyance unit should stop conveyance of the currently-being-conveyed original sheet.

3. The image reading apparatus as claimed in claim 2, wherein if the conveyance path switching information indicates that the conveyance path switching unit has switched the conveyance path to the first conveyance path, the control device determines that the conveyance unit should not stop conveyance of the currently-being-conveyed original sheet, without judging whether the type of the not-yet-conveyed original sheet is the first type or the second type.

4. The image reading apparatus as claimed in claim 1, wherein the first conveyance path includes a curved portion, the control device determines that the conveyance unit should stop conveyance of the currently-being-conveyed original sheet if the conveyance path switching information indicates that the conveyance path switching unit has switched the conveyance path to the first conveyance path and the not-yet-conveyed original sheet is of the second type, and the control device causes the conveyance unit to stop conveyance of the currently-being-conveyed original sheet if the control device determines that the conveyance unit should stop conveyance of the currently-being-conveyed original sheet.

5. The image reading apparatus as claimed in claim 1, further comprising:

a discharge port cover configured to be switched between a closed state closing the second discharge port and an open state opening the second discharge port; and an open/closed state detecting unit configured to detect whether the discharge port cover is currently in the open state or the closed state, and wherein the control device acquires the conveyance path switching information based on detection results by the open/closed state detecting unit.

6. The image reading apparatus as claimed in claim 1, further comprising a storage unit, and wherein the control device stores, in the storage unit, a detection result with respect to a width of the currently-being-conveyed original sheet, the width of the currently-being-conveyed original sheet having been detected by the width detecting unit when the currently-being-conveyed original sheet has been placed on the original sheet placing unit and has not yet been conveyed by the conveyance unit from the original sheet placing unit, the control device acquires the conveyance path switching information based on the detection result stored in the storage unit.

* * * * *